(12) United States Patent
Liu et al.

(10) Patent No.: US 8,957,135 B2
(45) Date of Patent: Feb. 17, 2015

(54) COMPOSITE POWDER, PREPARATION AND USE THEREOF

(71) Applicants: Yiqun Liu, Beijing (CN); Jinliang Qiao, Beijing (CN); Xiaohong Zhang, Beijing (CN); Fan Huang, Beijing (CN); Jianming Gao, Beijing (CN); Banghui Tan, Beijing (CN); Genshuan Wei, Beijing (CN); Zhihai Song, Beijing (CN); Zhida Chen, Beijing (CN)

(72) Inventors: Yiqun Liu, Beijing (CN); Jinliang Qiao, Beijing (CN); Xiaohong Zhang, Beijing (CN); Fan Huang, Beijing (CN); Jianming Gao, Beijing (CN); Banghui Tan, Beijing (CN); Genshuan Wei, Beijing (CN); Zhihai Song, Beijing (CN); Zhida Chen, Beijing (CN)

(73) Assignees: China Petroleum & Chemical Corporation, Beijing (CN); Sinopec Beijing Research Institute of Chemical Industry, Beijing (CN)

(*) Notice: Subject to any disclaimer, the term of this patent is extended or adjusted under 35 U.S.C. 154(b) by 0 days.

(21) Appl. No.: 13/731,895

(22) Filed: Dec. 31, 2012

(65) Prior Publication Data

US 2013/0225713 A1    Aug. 29, 2013

Related U.S. Application Data

(62) Division of application No. 10/818,950, filed on Apr. 5, 2004, now Pat. No. 8,362,128.

(30) Foreign Application Priority Data

Apr. 3, 2003    (CN) .................................. 03109108

(51) Int. Cl.
*C08J 3/215*    (2006.01)
*C08K 3/26*    (2006.01)
*C08J 3/12*    (2006.01)
*C08J 3/20*    (2006.01)
*C08K 3/00*    (2006.01)
*C08K 3/08*    (2006.01)
*C08K 3/22*    (2006.01)
*C08K 3/34*    (2006.01)
*C08K 3/36*    (2006.01)

(52) U.S. Cl.
CPC . *C08K 3/26* (2013.01); *C08J 3/122* (2013.01); *C08J 3/20* (2013.01); *C08K 3/0033* (2013.01); *C08K 3/08* (2013.01); *C08K 3/22* (2013.01); *C08K 3/346* (2013.01); *C08K 3/36* (2013.01); *C08J 2309/00* (2013.01); *C08J 2321/00* (2013.01)
USPC ............ 523/334; 524/445; 524/446; 524/447

(58) Field of Classification Search
USPC ................................... 523/334; 524/445–447
See application file for complete search history.

(56) References Cited

U.S. PATENT DOCUMENTS

2002/0165305 A1*  11/2002  Knudson et al. ............... 524/445
2005/0004294 A1*   1/2005  Chin et al. ..................... 524/445

* cited by examiner

*Primary Examiner* — Peter D Mulcahy
(74) *Attorney, Agent, or Firm* — Houst Consulting

(57) ABSTRACT

The present invention relates to a composite powder, preparation and use thereof. The composite powder according to the present invention is prepared by intimately mixing an irradiated or non-irradiated rubber latex with a slurry of inorganic particles in a ratio corresponding to that of rubber particles to inorganic particles in the composite powder according to the present invention, and then drying the resultant mixture. The composite powder according to the present invention comprises agglomerates composed of powdery rubber particles and inorganic particles, with inorganic particles being uniformly distributed either inside the agglomerates or both inside the agglomerates and on the surfaces thereof. The composite powder according to the present invention can be easily dispersed in plastic matrixes and thus can be compounded with plastics to produce toughened plastics and thermoplastic elastomers.

12 Claims, 3 Drawing Sheets

COMPOSITE POWDER, PREPARATION AND USE THEREOF

FIELD OF THE INVENTION

The present invention relates to a powder, more particularly, to a composite powder comprising rubber particles and inorganic particles, preparation and use thereof.

BACKGROUND OF THE INVENTION

The International Patent Publication WO 01/40356A1 (filed on Sep. 18, 2000, claiming the benefit of the Chinese Patent Application No. 99125530.5 filed by the present applicants on Dec. 3, 1999) discloses a fully vulcanized powdery rubber, which means discrete, fine rubber powders having a gel content of 60 percent by weight or more and freely flowing after drying without any partitioning agents. Such powdery rubbers are obtained by irradiating a rubber latex in the absence or presence of a cross-linking agent so as to cross-link them and fix the particle size of the rubber particles, and then subjecting the irradiated latex to precipitation or spray drying. The fully vulcanized powdery rubber thus obtained has a particle size in the range of from 20 to 2000 nm and can be used as tougheners for plastics, with excellent toughening effects being achieved. However, when such a powdery rubber is used for toughening plastics, the strength, modulus and thermal properties inherent in the plastics are frequently reduced.

Since 1980s, inorganic particles have been proposed for modifying plastics. However, inorganic particles have a very high surface energy, thus if no special treatment is conducted, they are apt to agglomerate when blending with plastics, which will significantly decrease their modification effects on plastics. For example, nano-clay materials are now being used for enhancing the rigidity of polyamides, with polyamide/clay nano-composites being obtained (see, for example, "Polymers-Inorganics Nano-composites", Series of Nanomaterials and Application Technologies, the Chemical and Industrial Press, December, 2002). The clays used for preparing polyamide/clay nano-composites are conventionally sheet clays, which possess a layered structure in a nanometric scale, are natural nano-materials and are very suitable for preparing nano-composites. However, the gaps among the layers of the sheet clays are very small, thus it is impossible for organic polymers to enter said gaps to exfoliate the sheet clays in a nanometric scale. Therefore, before used for preparing such polymer/clay nano-composites, clays must be subjected to a special treatment, i.e., displacement by various organic substances, thereby obtaining nano-precursor materials containing organic functional groups, which are then compounded with polymers to form nano-composites. The process for preparing such nano-precursor materials is also called organo-modification of clays. After such an organo-modification, organic functional groups, such as organic cations and the like, are introduced to the gaps of the sheet clays, which facilitates the insertion of monomers or polymers (see, for example, "Polymer-Inorganics Nano-composites", pp. 21-22). By intercalation-compounding, the layers of sheet clays subjected to organo-modification can be dispersed in polymer matrix in a nanometric scale, thereby obtaining polymer/clay nano-composites, which possess high strength, modulus, heat distortion temperature. The organo-modification of montmorillonite facilitates the intercalation-compounding and however, renders the preparation of composites complicated.

DISCLOSURE OF THE INVENTION

In view of the above, the present inventors conducted extensive and intensive researches in the field of toughening plastics, with a view of developing a novel toughener which can be used to toughen plastics and meanwhile, retains the strength, modulus and thermal properties inherent in plastics. As a result of many experiments, the present inventors found that by compounding powdery rubbers with inorganic particles, a composite powder comprising organic elastic particles and inorganic rigid particles can be obtained, and when blending with plastics, the organic elastic particles contained in such a composite powder prevent the agglomeration of inorganic particles, thus a better toughening effect can be achieved by toughening plastics with such a composite powder, compared to using elastic particles or inorganic particles alone, and meanwhile, the negative effects on rigidity and heat resistance of resins caused by the introduction of elastic particles are reduced. Furthermore, such a composite powder can be advantageously used for the preparation of thermoplastic elastomers.

Therefore, an object of the present invention is to provide a composite powder, which can be used for toughening plastics and for preparing thermoplastic elastomers.

Another object of the present invention is to provide a process for preparing the composite powder according to the present invention.

Still another object of the present invention is to provide use of the composite powder according to the present invention for preparing toughened plastics and thermoplastic elastomers.

The present invention in its one aspect provides a composite powder, comprising powdery rubber particles having a cross-linked structure and inorganic particles distributed between said rubber particles.

The present invention in its second aspect provides a process for preparing the composite powder according to the present invention, comprising intimately mixing an irradiated or non-irradiated rubber latex with a slurry of inorganic particles in a ratio corresponding to that of rubber particles to inorganic particles in the composite powder according to the present invention, and then drying the resultant mixture.

The present invention in its third aspect provides plastics toughened by the composite powder according to the present invention.

The present invention in its fourth aspect provides thermoplastic elastomers comprising the composite powder according to the present invention.

These and other objects, features and advantages of the present invention will be apparent after reading the whole description in conjunction with the drawings.

DETAILED DESCRIPTION OF THE INVENTION

Figure 1:
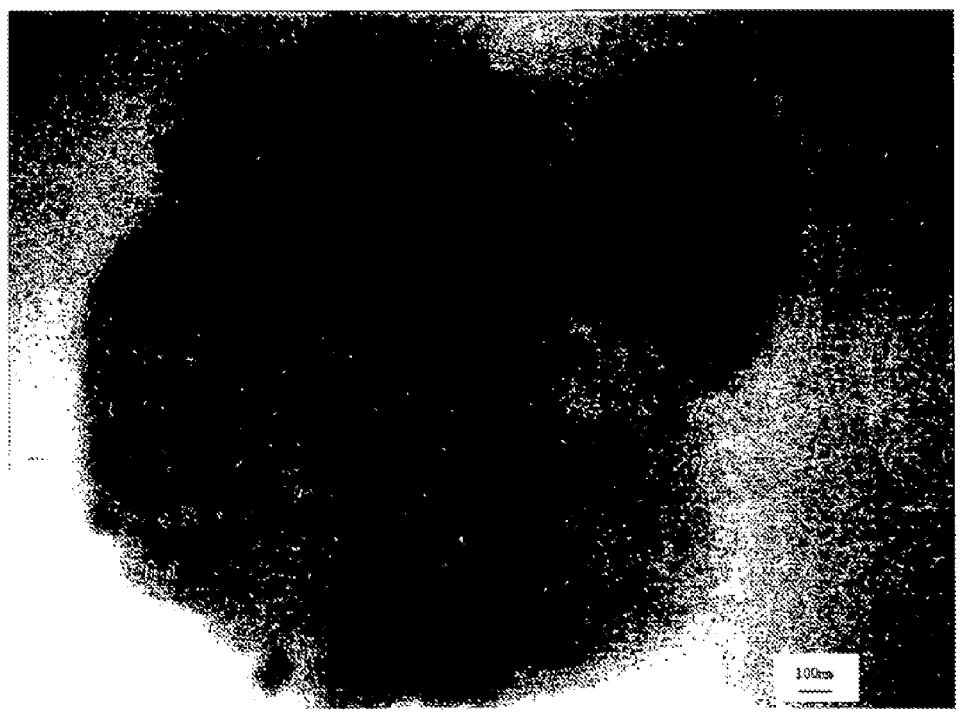
FIG. 1 is a transmission electron micrograph of the sample obtained in Example 15, in which the shadow stands for agglomerates composed of rubber particles and inorganic particles, which are dispersed in the plastic matrix, with the darker spots in the shadow being inorganic particles dispersed in agglomerated rubber particles.

The composite powder according to the present invention comprises powdery rubber particles having a cross-linked structure and inorganic particles distributed between said rubber particles, wherein the weight ratio of said rubber particles to said inorganic particles is from 99.5:0.5 to 20:80, preferably from 99:1 to 50:50.

In the composite powder according to the present invention, the inorganic particles are those commercially available in the prior art. There are no restrictions on the type of the inorganic particles as long as the size thereof falls within the scope of the present invention. However, the inorganic particles which are unstable when encountering water are excluded. The inorganic particles can be of any shape, such as spheres, ellipsoids, sheets, needles or irregular shapes. In the view of three-dimensional point, the individual particles have an average size of from 0.2 to 500 nm, preferably from 0.5 to 100 nm in at least one dimension.

The inorganic particles used in the composite powder according to the present invention can be selected from elemental metals or alloys thereof, such as gold, silver, copper, iron or alloys thereof; metal oxides, such as aluminum oxide ($Al_2O_3$), magnesium oxide (MgO), titanium dioxide ($TiO_2$), iron sesquioxide ($Fe_2O_3$), ferroferric oxide ($Fe_3O_4$), silver oxide ($Ag_2O$), zinc oxide (ZnO) and the like; metal or non-metal nitrides, such as aluminum nitride (AlN), silicon nitride ($SiN_4$) and the like; non-metal carbides, such as silicon carbide (SiC) and the like; non-metal oxides, such as silicon dioxide ($SiO_2$) and the like; metal hydroxides, such as aluminum hydroxide ($Al(OH)_3$), magnesium hydroxide ($Mg(OH)_2$) and the like; metal salts, including metal carbonates, silicates, sulfates and the like, such as calcium carbonate ($CaCO_3$), barium sulfate ($BaSO_4$), calcium sulfate ($CaSO_4$), silver chloride (AgCl) and the like; mineral earths, such as asbestos, talc, kaolin, mica, feldspar, wollastonite, montmorillonite and the like; and the mixtures of two or more of them.

The powdery rubber particles having a cross-linked structure used in the composite powder according to the present invention are those having a homogeneous structure, that is to say, individual particles are homogeneous in their composition and no heterogeneous phenomena, such as demixing, phase separation or the like can be observed in the particles by current microscopic technologies. In addition, the powdery rubber particles have a gel content of 60 percent by weight or more, preferably 75 percent by weight or more, more preferably 80 percent by weight or more.

The composite powder according to the present invention can be prepared by the process for preparing fully vulcanized powdery rubbers disclosed in the International Patent Publication WO 01/40356A1 filed by the present applicants on Sep. 18, 2000 (its full text is incorporated herein by reference), except that the irradiated latex is admixed with a slurry of inorganic particles prior to drying.

In addition, the composite powder according to the present invention can also be prepared by the process for preparing powdery cross-linked rubbers disclosed in Chinese Patent Application No. 00130386.4 filed by the present applicants on Nov. 3, 2000 (CN 1353131A, its full text is incorporated herein by reference), except that cross-linked rubber latexes are admixed with a slurry of inorganic particles prior to drying.

The composite powder according to the present invention can optionally comprise water-soluble nucleating agents for plastics and if such agents are present, the amount thereof is such that the weight ratio of the rubber particles to the nucleating agent in the composite powder according to the present invention is from 99:1 to 50:50, preferably from 97:3 to 70:30. The nucleating agent can be those conventionally employed in the art, preferably sodium benzoate.

The composite powder according to the present invention comprises agglomerates composed of powdery rubber particles and inorganic particles, with inorganic particles being uniformly distributed either inside the agglomerate or both inside the agglomerates and on the surfaces thereof, wherein the rubber particles themselves have a gel content of 60 percent by weight or more, preferably 75 percent by weight or more, more preferably 80 percent by weight or more. In addition to the agglomerates composed of powdery rubber particles and inorganic particles, the composite powder according to the present invention may contain discrete inorganic particles. Especially when the content of the inorganic particles is high, inorganic particles are apt to occur outside the agglomerates.

The agglomerating state possessed by the composite powder according to the present invention can be retained in the composition obtained by melt-blending the composite powder with non-polar plastics (such as polypropylenes or polyethylenes). By subjecting the composition to microtoming and then observing under a transmission electron microscope, a photograph reflecting such an agglomerating state can be obtained (see FIG. 1).

The composite powder according to the present invention can be prepared by intimately mixing an irradiated or non-irradiated rubber latex with a slurry of inorganic particles in a ratio corresponding to that of rubber particles to inorganic particles in the composite powder according to the present invention, and then drying the resultant mixture.

More particularly, the composite powder according to the present invention can be prepared by:

a. intimately mixing a slurry of inorganic particles with a cross-linked synthetic rubber latex to obtain a mixed latex and then drying the mixed latex; or b. vulcanizing a rubber latex by high-energy irradiation in the absence or presence of a cross-linking agent, intimately mixing a slurry of inorganic particles with the irradiated rubber latex to obtain a mixed latex and then drying the mixed latex.

In the process for preparing the composite powder according to the present invention, the slurry of inorganic particles is an aqueous suspension of inorganic particles and can be commercially available slurries. However, prior to mixing with rubber latexes, the commercially available slurries are normally dispersed by means of a conventional dispersing equipment (such as a high-shear dispersing and emulsifying machine, colloidal mill and the like) so as to ensure that the solid particles in the slurries can be homogeneously dispersed in water. If the slurry of inorganic particles are not commercially available, they can be prepared by dispersing inorganic particles in a suitable amount of water by means of conventional dispersing equipments to form a stable suspension, which is then mixed with a rubber latex.

In the process for preparing the composite powder according to the present invention, the inorganic particles are those commercially available in the art. There are no restrictions on the type of the inorganic particles as long as the size thereof falls within the scope of the present invention. However, the inorganic particles which are unstable when encountering water are excluded. The inorganic particles can be of any shape, such as spheres, ellipsoids, sheets, needles or irregular shapes. In the view of three-dimensional point, the individual particles have an average size of from 0.2 to 500 nm, preferably from 0.5 to 100 nm in at least one dimension.

The inorganic particles used in the process according to the present invention can be selected from elemental metals or alloys thereof, such as gold, silver, copper, iron or alloys thereof; metal oxides, such as aluminum oxide ($Al_2O_3$), magnesium oxide (MgO), titanium dioxide ($TiO_2$), iron sesquioxide ($Fe_2O_3$), ferroferric oxide ($Fe_3O_4$), silver oxide ($Ag_2O$), zinc oxide (ZnO) and the like; metal or non-metal nitrides, such as aluminum nitride (AlN), silicon nitride ($SiN_4$) and the like; non-metal carbides, such as silicon carbide (SiC) and the like; non-metal oxides, such as silicon dioxide ($SiO_2$) and the like; metal hydroxides, such as aluminum hydroxide ($Al(OH)_3$), magnesium hydroxide ($Mg(OH)_2$) and the like; metal salts, including metal carbonates, silicates, sulfates and the like, such as calcium carbonate ($CaCO_3$), barium sulfate ($BaSO_4$), calcium sulfate ($CaSO_4$), silver chloride (AgCl) and the like; mineral earths, such as asbestos, talc, kaolin, mica, feldspar, wollastonite, montmorillonite and the like; and the mixtures of two or more of them.

In the process for preparing the composite powder according to the present invention, the ratio of the weight of the rubber contained in the rubber latex (i.e., dry weight or solid content of the rubber latex) to the weight of the inorganic particles contained in the slurry of inorganic particles (i.e., dry weight of the slurry of inorganic particles) is from 99.5:0.5 to 20:80, preferably from 99:1 to 50:50.

In the process variant a. or b. for preparing the composite powder according to the present invention, the mixed latex can be obtained by intimately mixing a slurry of inorganic particles, an aqueous solution of water-soluble nucleating agent for plastics and the irradiated rubber latex (in the process variant b.) or the cross-linked rubber latex (in the process variant a.). The ratio of the dry weight of the irradiated rubber latex or the cross-linked rubber latex to the weight of the nucleating agent contained in the aqueous nucleating agent solution is from 99:1 to 50:50, preferably from 97:3 to 70:30. The composite powder thus obtained can improve the tougheness of plastics and at the same time, promote the crystallization of crystalline plastics, which results in further improvement in the rigidity of plastics. In the process according to the present invention, there is no restriction on the water-soluble nucleating agent for plastics as long as it is water-soluble and promotes the nucleation of plastics. Sodium benzoate is preferably used.

In the process for preparing the composite powder according to the present invention, it is possible to add the slurry of inorganic particles and optionally, an aqueous solution of water-soluble nucleating agent for plastics to the irradiated rubber latex or the cross-linked rubber latex while stirring so as to intimately mix them. There are no particular restrictions on the concentrations of the rubber latex, the slurry of inorganic particles and the aqueous nucleating agent solution. The drying can be carried out by using the drying method for preparing the fully vulcanized powdery rubber disclosed in the International Patent Publication WO 01/40356A1 and the International Patent Publication WO 01/98395 (filed on Jun. 15, 2001, claiming the benefit of the Chinese Patent Application No. 00109217.0 filed by the present applicants on Jun. 15, 2000), that is to say, the drying can be carried out by means of a spray dryer, with the inlet temperature and the outlet temperature being controlled to be 100 to 200° C. and 20 to 80° C., respectively. The rubbers contained the composite powders obtained by using the above process variants a. and b. has a gel content equal to that in the cross-linked synthetic rubber latex in process variant a. and that in the irradiated rubber latex in process variant b., respectively.

After a series of experiments, the present inventors found that some rubber latexes undergo a certain degree of cross-linking between the rubber molecules during their synthesis, which results in rubber latexes having a certain degree of cross-linking. Such rubber latexes are referred to as cross-linked rubber latexes. The Chinese Patent Application No. 00130386.4 (CN 1353131A) filed by the present applicants on Nov. 3, 2000 mentioned such a cross-linked synthetic rubber latex, which has a gel content of 80 percent by weight or more, preferably 85 percent by weight or more. Such a rubber latex is per se cross-linked to a higher degree, and thus can be directly spray dried to obtain powdery rubbers, without further irradiation cross-linking. In the process variant a. for preparing the composite powder according to the present invention, such cross-linked synthetic rubber latexes are used as the starting materials. Cross-linked synthetic rubber latexes can be selected from the group consisting of cross-linked styrene-butadiene latex, cross-linked carboxylated styrene-butadiene latex, cross-linked polybutadiene latex, cross-linked acrylonitrile-butadiene latex, cross-linked carboxylated acrylonitrile-butadiene latex, cross-linked neoprene latex and cross-linked acrylic latex.

In the process variant b. for preparing the composite powder according to the present invention, there are no restrictions on the rubber latexes as the starting materials. For example, they can be rubber latexes used for preparing the fully vulcanized powdery rubbers in the International Patent Publications WO 01/40356A1 and WO 01/98395, such as natural rubber latex, styrene-butadiene rubber latex, carboxylated styrene-butadiene rubber latex, acrylonitrile-butadiene rubber latex, carboxylated acrylonitrile-butadiene rubber latex, polybutadiene rubber latex, neoprene rubber latex, silicone rubber latex, acrylic rubber latex, butadiene-styrene-vinylpyridine rubber latex, isoprene rubber latex, butyl rubber latex, ethylene-proplyene rubber latex, polysulfide rubber latex, acrylate-butadiene rubber latex, urethane rubber latex, fluorine rubber latex and the like.

The rubber latexes used in the process variant b. for preparing the composite powder according to the present invention can also include the cross-linked synthetic rubber latexes used in the process variant a., that is to say, the cross-linked synthetic rubber latexes can be used to prepare the composite powder according to the present invention without irradiation (as in the process variant a.) or with irradiation (as in the process variant b.), with the gel content of the rubber in the composite powder obtained by the process variant b. being higher than that by the process variant a.

There are no particular restrictions on the solid content (i.e., dry weight) of the rubber latexes used in the above two process variants, which is normally from 20 to 70 percent by weight, preferably from 30 to 60 percent by weight, more preferably from 40 to 50 percent by weight. The average particle size of the rubber particles in these rubber latexes is from 20 to 2000 nm, preferably from 30 to 1500 nm, more preferably from 50 to 500 nm. After irradiating the rubber latexes, the rubber particles contained therein acquire a relatively high gel content (60 percent by weight or more), or in the case of the cross-linked synthetic rubber latexes, the particle size of the rubber particles is fixed due to the high gel content, thus after co-spraying the rubber latex and the slurry of inorganic particles, the particle size of individual rubber particles is consistent with that of the rubber particles contained in the rubber latexes as the starting material, i.e., from 20 to 2000 nm, preferably from 30 to 1500 nm, more preferably from 50 to 500 nm, irrespective as of whether the rubber particles are in the form of agglomerates or in free state.

In the process variant b. for preparing the composite powder according to the present invention, the conditions for irradiating rubber latexes, including cross-linking agents, irradiation doses, sources of high-energy irradiation and the like, are same as those in the process for preparing fully vulcanized powdery rubbers disclosed in the International Patent Publications WO 01/40356A1 and WO 01/98395. During the irradiation of rubber latexes, a cross-linking agent is optionally used. The cross-linking agent used can be selected from the group consisting of mono-, di-, tri-, tetra- or multi-functional cross-linking agents, and any combination thereof. Examples of monofunctional cross-linking agents include, but not limited to, octyl(meth)acrylate, iso-octyl (meth)acrylate, glycidyl(meth)acrylate; examples of difunctional cross-linking agents include, but not limited to, 1,4-butanediol di(meth)acrylate, 1,6-hexanediol di(meth) acrylate, diethylene glycol di(meth)acrylate, triethylene glycol di(meth)acrylate, neopentyl glycol di(meth)acrylate, divinylbenzene; examples of trifunctional cross-linking agents include, but not limited to, trimethylolpropane tri (meth)acrylate, pentaerythritol tri(meth)acrylate; examples of tetrafunctional cross-linking agents include, but not limited to pentaerythritol tetra(meth)acrylate, ethoxylated pentaerythritol tetra(meth)acrylate; examples of multi-functional cross-linking agents include, but not limited to dipentaerythritol penta(meth)acrylate. In the context of the present application, the term "(meth)acrylate" means acrylate or methacrylate. These cross-linking agents can be used alone or in any combination, as long as they facilitate the vulcanization under irradiation.

The amount of the cross-linking agent added varies depending on the type and formulation of the rubber latexes, and is generally from 0.1 to 10 percent by weight, preferably from 0.5 to 9 percent by weight, more preferably from 0.7 to 7 percent by weight, based on the dry weight of the latexes.

In the process variant b. for preparing the composite powder according to the present invention, the high-energy irradiation which can be used is selected from the group consisting of cobalt sources (such as Co-60), UV ray sources and high-energy electron accelerators, preferably cobalt sources. The irradiation dose can be from 0.1 to 30 Mrad, preferably from 0.5 to 20 Mrad. The irradiation dose depends on the type and formulation of the rubber latexes. Generally, the irradiation dose is such that the rubber latexes after vulcanization under irradiation have a gel content of 60 percent by weight or more, preferably 75 percent by weight, more preferably 80 percent by weight or more.

The composite powder according to the present invention, prepared by co-spraying the rubber latexes, the slurry of inorganic particles and the like, comprises agglomerates composed of powdery rubber particles and inorganic particles, with inorganic particles being uniformly distributed either inside the agglomerate or both inside the agglomerates and on the surfaces thereof, wherein the rubber particles themselves have a gel content of 60 percent by weight or more, preferably 75 percent by weight or more, more preferably 80 percent by weight or more. In addition to the agglomerates composed of powdery rubber particles and inorganic particles, the composite powder according to the present invention may contain discrete inorganic particles. Especially when the content of the inorganic particles is high, inorganic particles are apt to occur outside the agglomerates.

The agglomerating state possessed by the composite powder according to the present invention can be retained in the composition obtained by melt-blending the composite powder with non-polar plastics (such as polypropylenes or polyethylenes). By subjecting the composition to microtoming and then observing under a transmission electron microscope, a photograph reflecting such an agglomerating state can be obtained (see FIG. 1).

Figure 3:
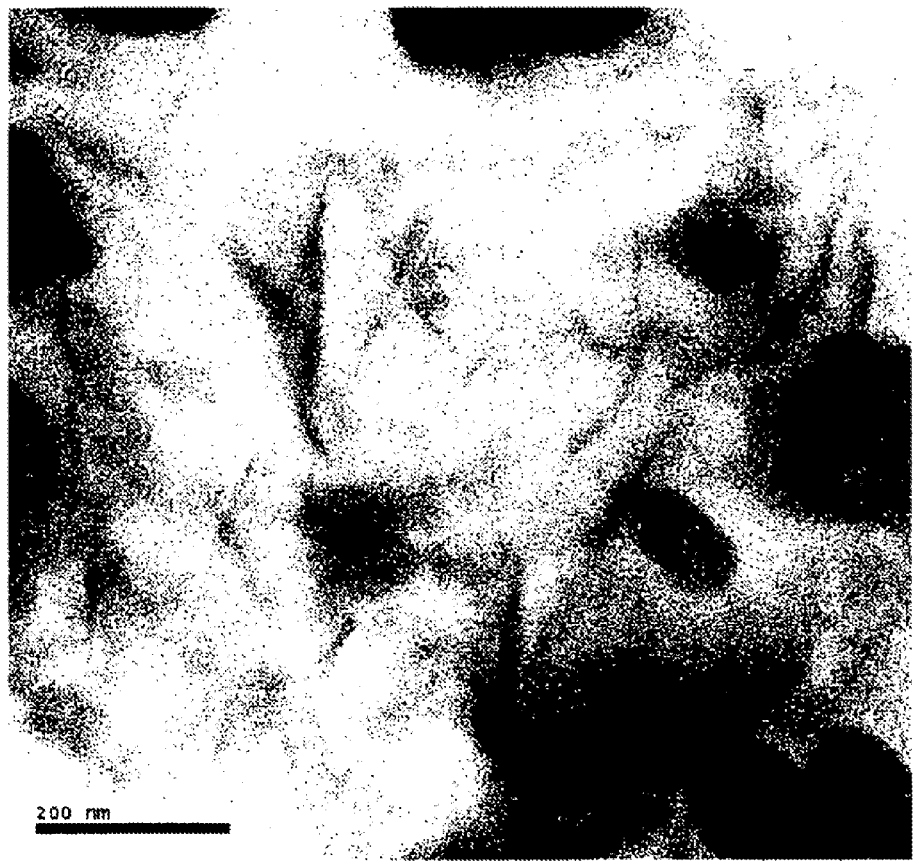
FIG. 3 is a transmission electron micrograph of the sample obtained in Example 14, in which the circular shadow stands for butadiene-styrene-vinylpyridine rubber particles and the strip-shaped shadow stands for sodium-based montmorillonite, with the rubber particles and montmorillonite being uniformly dispersed in the polyamide matrix and at the same time, the sheet montmorillonite being completely exfoliated in the matrix.

The composite powder according to the present invention can be dispersed in plastic matrixes by conventional blending processes, wherein the rubber particles facilitate the uniform dispersion of inorganic particles in the matrix and thus the agglomeration of inorganic particles is substantially avoided. In non-polar resin matrixes (such as polypropylene or polyethylene), inorganic particles are uniformly distributed in the agglomerates composed of inorganic particles and rubber particles, which results in a good modification effect. In the case of resin matrixes which chemically react with the rubber particles in the interface or have a large interaction with the rubber particles in the interface, the rubber particles contained in the composite powder according to the present invention can be dispersed in the resin matrixes in the form of individual particles after melt-blending, and due to the fact that the inorganic particles contained in the composite powder are uniformly dispersed between the rubber particles, the ideal dispersion of the rubber particles in the resin facilitates the dispersion of inorganic particles. For example, in the case of layered inorganic particles like montmorillonite, by preparing a composite powder comprising montmorillonite particles and rubber particles, montmorillonite can be dispersed in polar resin matrixes like nylons in an exfoliated state by the action of rubber particles (as shown in FIG. 3), without the complicated organo-modification.

The process for preparing the composite powder according to the present invention is simple, convenient and easy to carry out. When the composite powder according to the present invention is used for toughening plastics, a better toughening effect can be achieved, compared to using rubber elastic particles alone, and meanwhile, the negative effects on rigidity and heat resistance of resins caused by the introduction of elastic particles are reduced. Furthermore, the composite powder according to the present invention can be advantageously used for the preparation of thermoplastic elastomers.

The composite powder according to the present invention can be dispersed in plastics very easily, thus can be mixed with various plastics to prepare a number of toughened plastics and thermoplastic elastomers. The preparation of toughened plastics or thermoplastic elastomers can be carried out by simply mixing the composite powder according to the present invention and plastics in a certain proportion in conventional blending equipments under conventional processing conditions, if necessary, in the presence of conventional processing aids and compatilizers.

In the preparation of toughened plastics, the weight ratio of the composite powder according to the present invention to plastics is from 0.5:99.5 to 50:50, preferably from 1:99 to 30:70. The plastics to be toughened can be nylons, polypropylenes, polyethylenes, polyvinyl chloride, polyurethanes, polyesters, polycarbonates, polyoxymethylene, polystyrene, polyphenylene oxide (PPO), polyphenylene sulfide (PPS), polyimides, polysulfones, epoxy resins, unsaturated polyesters, phenolic resins, amino resins, alkyd resins, diallyl phthalate resins, silicone resins or blends or mixtures thereof.

In the preparation of thermoplastic elastomers, the weight ratio of the composite powder according to the present invention to plastics is from 30:70 to 75:25, preferably from 50:50 to 70:30. The plastics which can be used are nylons, polypropylenes, polyethylenes, polyvinyl chloride, polyurethanes, polyesters, polycarbonates, polyoxymethylene, polystyrene, polyphenylene oxide (PPO), polyphenylene sulfide (PPS), polyimides, polysulfones, epoxy resins, unsaturated polyesters, phenolic resins, amino resins, alkyd resins, diallyl phthalate resins, silicone resins or blends or mixtures thereof.

EXAMPLES

The present invention is further described with reference to the following examples, which shall not be construed as limiting the present invention in any way. The scope of the present invention will be defined in the appended claims.
Testing and Characterizing Method of the Morphology of the Composite Powder:

The composite powder, propylene homopolymer powder or pellets (melt index: <5 g/10 min) and an antioxidant (Irganox 1010, Ciba-Geigy) are compounded at a weight ratio of the composite powder:polypropylene:1010 of 100:10:0.5 in a high speed stirrer for 1 minute. The blending and pelleting are carried out in a ZSK-25 twin-screw extruder (Werner & Pfleiderer Co., Germany), with the temperatures for each section of the extruder being respectively 165° C., 190° C., 195° C., 195° C., 195° C. and 195° C. (die temperature). The extruded strips are subjected to microtoming under −100° C., staining with $OsO_4$ and then observing under a transmission electron microscope.

Example 1

5 kg of carboxylated butadiene-styrene rubber latex having a solid content of 50 percent by weight (available from Beijing Yanshan Petrochemical Company, Brand: XSBRL-54B1, average particle size of the rubber particles in latex: 150 nm) is placed in a vessel, 75 g of iso-octyl acrylate is added dropwise while stirring, and the stirring is continued for 1 hour after the completion of addition. Thereafter, the rubber latex is irradiated with Co-60, with the irradiation dose being 2.5 Mrad and the irradiation dose rate being 50 Gy/min. The rubber particles in the irradiated latex have a gel content of 92.6%. A slurry of calcium carbonate (Fine Chemical Factory of Beijing University of Chemical Technology, solid content: 47.3%, average size in one dimension of the particles: 40 to 60 nm) is compounded with the irradiated latex at a weight ratio of 50:50 (on dry basis) while stirring for 1 hour. The mixed latex is spray dried by means of a spray dryer, with the inlet temperature and the outlet temperature being 140 to 160° C. and 40 to 60° C., respectively. A dried carboxylated butadiene-styrene rubber/calcium carbonate composite powder 1 is then collected in a cyclone.

Example 2

500 kg of calcium carbonate powders (Fine Chemical Factory of Beijing University of Chemical Technology, average size in one dimension of the particles: 40 to 60 nm) are mixed with 1 kg water in a vessel, the resultant mixture is then dispersed by means of a high-shear dispersing and emulsifying machine to obtain a suspension, which is then compounded with the irradiated carboxylated butadiene-styrene rubber latex (prepared as in Example 1) at a weight ratio of 50:50 (on dry basis) while stirring for 1 hour. The mixed latex is spray dried by means of a spray dryer, with the inlet temperature and the outlet temperature being 140 to 160° C. and 40 to 60° C., respectively. A dried carboxylated butadiene-styrene rubber/calcium carbonate composite powder 2 is then collected in a cyclone.

Example 3

5 kg of butadiene-styrene rubber latex having a solid content of 45 percent by weight (available from Lanzhou Petrochemical Company, Brand: DINGBEN-50, gel content: 88.9%, average particle size of the rubber particles in latex: 100 nm) is placed in a vessel, 67.5 g of iso-octyl acrylate is added dropwise while stirring, and the stirring is continued for 1 hour after the completion of addition. Thereafter, the rubber latex is irradiated with Co-60, with the irradiation dose being 2.5 Mrad and the irradiation dose rate being 50 Gy/min. The rubber particles in the irradiated latex have a gel content of 90.0%. A slurry of calcium carbonate (as in Example 1) is compounded with the irradiated latex at a weight ratio of 90:10 (on dry basis) while stirring for 1 hour. The mixed latex is spray dried by means of a spray dryer, with the inlet temperature and the outlet temperature being 140 to 160° C. and 40 to 60° C., respectively. A dried butadiene-styrene rubber/calcium carbonate composite powder 1 is then collected in a cyclone.

Example 4

The procedure same as in Example 3 is followed, except that the butadiene-styrene rubber latex, without irradiation, is directly compounded with the slurry of calcium carbonate at a weight ratio of 80:20 (on dry basis) while stirring for 1 hour. The mixed latex is spray dried by means of a spray dryer, with the inlet temperature and the outlet temperature being 140 to 160° C. and 40 to 60° C., respectively. A dried butadiene-styrene rubber/calcium carbonate composite powder 2 is then collected in a cyclone.

Example 5

The procedure same as in Example 3 is followed, except that the butadiene-styrene rubber latex, without irradiation, is directly compounded with the slurry of calcium carbonate and an aqueous solution of sodium benzoate (available from Wuhan Youjishiye Corporation) at a weight ratio of 80:20:10 (on dry basis) while stirring for 1 hour. The mixed latex is spray dried by means of a spray dryer, with the inlet temperature and the outlet temperature being 140 to 160° C. and 40 to 60° C., respectively. A dried butadiene-styrene rubber/calcium carbonate composite powder containing the nucleating agent is then collected in a cyclone.

Example 6

Sodium-based montmorillonite (available from Qinghe Factory, Zhangjiakou, Hebei, the particles can be dispersed as flakes of 1 to 20 nm thick and 200 to 1000 nm long) is mixed with water in a concentration of 5 percent by weight, dispersed by means of a high-shear disperser and then placed for more than one week. After that period, the mixture is dispersed again by means of a high-shear disperser to obtain a stable suspension, with the layers of sheet montmorillointe being sufficiently exfoliated. The irradiated butadiene-styrene rubber latex (prepared as in Example 3) is compounded with the above slurry of montmorillonite at a weight ratio of 90:10 (on dry basis) while stirring for 1 hour. The mixed latex is spray dried by means of a spray dryer, with the inlet temperature and the outlet temperature being 140 to 160° C. and 40 to 60° C., respectively. A dried butadiene-styrene rubber/montmorillonite composite powder 1 is then collected in a cyclone.

Example 7

The procedure same as in Example 6 is followed, except that the weight ratio of the irradiated butadiene-styrene rubber latex to the slurry of sodium-based montmorillonite is changed to 99:1 (on dry basis), with a dried butadiene-styrene rubber/montmorillonite composite powder 2 being obtained.

Example 8

Silicon dioxide powders (available from Shenyang Chemical Corporation, average size in one dimension of its particles: 7 to 30 nm) are mixed with water in a concentration of 5 percent by weight and then dispersed by means of a high-shear disperser to obtain a stable suspension. 5 kg of carboxylated acrylonitrile-butadiene rubber latex having a solid content of 45 percent by weight (available from Lanzhou Petrochemical Company, Brand: XNBRL, average particle size of the rubber particles in latex: 50 nm) is placed in a vessel, 67.5 g of iso-octyl acrylate is added dropwise while stirring, and the stirring is continued for 1 hour after the completion of addition. Thereafter, the rubber latex is irradiated with Co-60, with the irradiation dose being 2.5 Mrad and the irradiation dose rate being 50 Gy/min. The rubber particles in the irradiated latex have a gel content of 96.1%. The irradiated acrylonitrile-butadiene rubber latex is compounded with the above slurry of silicon dioxide at a weight ratio of 90:10 (on dry basis) while stirring for 1 hour. The mixed latex is spray dried by means of a spray dryer, with the inlet temperature and the outlet temperature being 140 to 160° C. and 40 to 60° C., respectively. A dried carboxylated acrylonitrile-butadiene rubber/silicon dioxide composite powder is then collected in a cyclone.

Example 9

The procedure same as in Example 8 is followed, except that the slurry of silicon dioxide is replaced by the slurry of calcium carbonate (as in Example 1), with a dried carboxylated acrylonitrile/calcium carbonate composite powder being obtained.

Example 10

Titanium dioxide powders (available from Beijing University of Chemical Technology, average size in one dimension of its particles: 40 to 60 nm) are mixed with water in a concentration of 20 percent by weight and then dispersed by means of a high-shear disperser to obtain a stable suspension. The irradiated butadiene-styrene rubber latex (prepared as in Example 3) is compounded with the above slurry of titanium dioxide at a weight ratio of 95:5 (on dry basis) while stirring for 1 hour. The mixed latex is spray dried by means of a spray dryer, with the inlet temperature and the outlet temperature being 140 to 160° C. and 40 to 60° C., respectively. A dried butadiene-styrene rubber/titanium dioxide composite powder is then collected in a cyclone.

Example 11

Magnesium hydroxide powders (available from Beijing University of Chemical Technology, average size in one dimension of its particles: 20 to 40 nm) is mixed with water in a concentration of 20 percent by weight and then dispersed by means of a high-shear disperser to obtain a stable suspension. 5 kg of acrylonitrile-butadiene rubber latex having a solid content of 45 percent by weight (available from the Latex Reseach Center, Lanzhou Petrochemical Company, Brand: DINGJING-26, average particle size of the rubber particles in latex: 100 nm) is placed in a vessel, 112.5 g of trimethylolpropane triacrylate is added dropwise while stirring, and the stirring is continued for 1 hour after the completion of addition. Thereafter, the rubber latex is irradiated with Co-60, with the irradiation dose being 1.0 Mrad and the irradiation dose rate being 50 Gy/min. The rubber particles in the irradiated latex have a gel content of 90.0%. The irradiated acrylonitrile-butadiene rubber latex is compounded with the above slurry of magnesium hydroxide at a weight ratio of 40:60 (on dry basis) while stirring for 1 hour. The mixed latex is spray dried by means of a spray dryer, with the inlet temperature and the outlet temperature being 140 to 160° C. and 40 to 60° C., respectively. A dried acrylonitrile-butadiene rubber/magnesium hydroxide composite powder is then collected in a cyclone.

Example 12

5 kg of butadiene-styrene-vinylpyridine rubber latex having a solid content of 40 percent by weight (available from Changzhihai Latex Company, Cixi, Zhejiang, Brand: 55555, average particle size of the rubber particles in latex: 100 nm) is placed in a vessel, 100 g of trimethylolpropane triacrylate is added dropwise while stirring, and the stirring is continued for 1 hour after the completion of addition. Thereafter, the rubber latex is irradiated with Co-60, with the irradiation dose being 2.5 Mrad and the irradiation dose rate being 50 Gy/min. The rubber particles in the irradiated latex have a gel content of 87.0%. The irradiated rubber latex is compounded with the slurry of montmorillonite (prepared as in Example 6) at a weight ratio of 95:5 (on dry basis) while stirring for 1 hour. The mixed latex is spray dried by means of a spray dryer, with the inlet temperature and the outlet temperature being 140 to 160° C. and 40 to 60° C., respectively. A dried butadiene-styrene-vinylpyridine rubber/montmorillonite composite powder is then collected in a cyclone.

Example 13

50 g of metallic silver powders (Zhengyuan Nanomaterial Engineering Company, Shangdong, average size: 20 to 80 nm) are mixed with 1 kg water in a vessel and then dispersed in a high-shear dispersing and emulsifying machine to obtain a suspension. The resultant suspension is compounded with the irradiated carboxylated butadiene-styrene rubber latex (prepared as in Example 1) at a weight ratio of 1:99 (on dry basis) while stirring for 1 hour. The mixed latex is spray dried by means of a spray dryer, with the inlet temperature and the outlet temperature being 140 to 160° C. and 40 to 60° C., respectively. A dried carboxylated butadiene-styrene rubber/metallic silver composite powder is then collected in a cyclone.

Example 14

The butadiene-styrene-vinylpyridine rubber/montmorillointe composite powder prepared as in Example 12 is compounded with Nylon 6 (available from UBE, Japan, Brand: 1013B) and antioxidant Irganox 1010 (available from Ciba-Geigy, Switzerland) at a weight ratio of Nylon 6:the composite powder:1010 of 100:15:0.3. The blending and pelleting are carried out in a ZSK-25 twin-screw extruder (Werner & Pfleiderer Co., Germany), with the temperatures for each section of the extruder being respectively 220° C., 235° C., 235° C., 235° C., 235° C. and 235° C. (die temperature). The extruded pellets are injection-molded into standard test bars and then subjected to various tests of mechanical properties. The results are listed in Table 1. FIG. 3 is the micrograph of the sample.

Comparative Example 1

The nylon pellets as in Example 14 are compounded with a powdery butadiene-styrene-vinylpyridine rubber (obtained by directly spray drying the irradiated butadiene-styrene-vinylpyridine rubber latex as in Example 12, without mixing the slurry of montmorillonite) and antioxidant Irganox 1010 at a weight ratio of nylon:powdery butadiene-styrene-vinylpyridine rubber:1010 of 100:15:0.3. Standard test bars are obtained by extruding and injection-molding as in Example 14 and then subjected to various tests of mechanical properties. The results are listed in Table 1.

Comparative Example 2

The procedure as in Example 14 is followed, except that no composite powder is used. Standard test bars are obtained by extruding and injection-molding as in Example 14 and then subjected to various tests of mechanical properties. The results are listed in Table 1.

Example 15

The butadiene-styrene rubber/calcium carbonate composite powder containing a nucleating agent prepared as in Example 5 is compounded with polypropylene pellets (available from Luoyang Petrochemical Company, Brand: B-200, melt index: 0.35 g/10 min) and antioxidant Irganox 1010 (available from Ciba-Geigy, Switzerland) at a weight ratio of polypropylene:the composite powder of 100:10, with the amount of the antioxidant being 0.25 part by weight per 100 parts by weight of the total weight of polypropylene and the composite powder, the resultant mixture is mixed for 1 minute in a high speed stirrer. The blending and pelleting are carried out in a ZSK-25 twin-screw extruder (Werner & Pfleiderer Co., Germany), with the temperatures for each section of the extruder being respectively 165° C., 190° C., 195° C., 195° C., 195° C. and 195° C. (die temperature). The extruded pellets are injection-molded into standard test bars and then subjected to various tests of mechanical properties. The results are listed in Table 1. FIG. 1 is the micrograph of the sample.

Comparative Example 3

The procedure as in Example 15 is followed, except that no composite powder is used and that polypropylene is compounded with the antioxidant at a weight ratio of 100:0.25. The extruded pellets are injection-molded into standard test bars and then subjected to various tests of mechanical properties. The results are listed in Table 1.

Comparative Example 4

The procedure as in Example 15 is followed, except that the butadiene-styrene rubber/calcium carbonate composite powder containing a nucleating agent is replaced by a powdery butadiene-styrene rubber containing sodium benzoate (prepared by adding 45 g of sodium benzoate to 1 kg of the butadiene-styrene rubber latex as in Example 3 while stirring, continuing the stirring for 1 hour, spray drying the resultant mixed latex by means of a spray dryer, with the inlet temperature and the outlet temperature being 125 to 145° C. and 45 to 60° C., respectively, and then collecting the dried butadiene-styrene rubber/sodium benzoate composite powder in a cyclone, the weight ratio of the butadiene-styrene rubber to sodium benzoate in the powder: 100:10). The extruded pellets are injection-molded into standard test bars and then subjected to various tests of mechanical properties. The results are listed in Table 1.

TABLE 1

| No. | Tensile strength (MPa) | Elongation at break (%) | Izod notched impact strength (J/m)23° C. | Izod notched impact strength (J/m)−20° C. | Flexural strength (MPa) | Flexural modulus (GPa) | Heat distortion temperature (° C.)1.8 MPa |
|---|---|---|---|---|---|---|---|
| Ex. 14 | 60.8 | 25 | 116 | 90.1 | 85.7 | 2.01 | 69.2 |
| Comp. Ex. 1 | 56.2 | 40 | 107 | 61.5 | 79.8 | 1.83 | 66.5 |
| Comp. Ex. 2 | 82.4 | 16 | 34.4 | 29.8 | 111 | 2.41 | 67.4 |
| Ex. 15 | 34.6 | 120 | 221 | 31.5 | 36.0 | 1.57 | 116.4 |
| Comp. Ex. 3 | 36.5 | 145 | 64.4 | 26.2 | 36.2 | 1.54 | 106.8 |
| Comp. Ex. 4 | 33.9 | 119 | 186 | — | 35.9 | 1.53 | 116.0 |
| Testing Standard | GB 1040 | GB 1040 | GB 1843 | GB 1843 | GB 9341 | GB 9341 | GB 1634 |

Example 16

Polypropylene (Daqing Huake Corporation, propylene homopolymer pellets, melt index: 0.4 g/10 min) is intimately mixed with the butadiene-styrene rubber/calcium carbonate composite powder 2 prepared as in Example 4 at a weight ratio of 50:50 in a high speed mixer. The blending and pelleting are carried out in a ZSK-25 twin-screw extruder (Werner & Pfleiderer Co., Germany), with the temperatures for each section of the extruder being respectively 170° C., 190° C., 200° C., 210° C., 220° C. and 210° C. (die temperature). The extruded pellets of the fully vulcanized thermoplastic elastomer are injection-molded into standard test bars and then subjected to various tests of mechanical properties. The results are listed in Table 2.

Comparative Example 5

The procedure as in Example 16 is followed, except that the butadiene-styrene rubber/calcium carbonate composite powder 2 is replaced by a powdery butadiene-styrene rubber (obtained by directly spray drying the irradiated butadiene-styrene rubber latex as in Example 3, without mixing the slurry of calcium carbonate). The extruded pellets of the fully vulcanized thermoplastic elastomer are injection-molded into standard test bars and then subjected to various tests of mechanical properties. The results are listed in Table 2.

TABLE 2

| Sample | Shore hardness (HD) | Tensile strength at break (MPa) | Permanent compression deformation (22 hrs, 23° C.), % |
|---|---|---|---|
| Comp. Ex. 5 | 49 | 16.4 | 15.8 |
| Ex. 16 | 48 | 19.6 | 16.0 |

Example 17

Figure 2:
FIG. 2 is a transmission electron micrograph of the sample obtained in Example 17, in which the shadow stands for agglomerates composed of rubber particles and inorganic particles, which are dispersed in the plastic matrix, with the darker spots in the shadow being inorganic particles dispersed in agglomerated rubber particles.

28.8 g of epoxy resin prepolymer (Wuxi Resin Factory, Brand: E-44), 51.84 g of Premix 1 (prepared as follows) and 54 g of methyl-tetrahydrophthalic anhydride (Oriental Chemical Factory, Jiaxing, Zhejiang) are weighted into a three-necked flask, heated by a thermostatic water bath at 90° C. and then mixed while stirring for 30 minutes. To the resultant mixture is added 0.36 g of triethanolamine (analytic pure, available from Beijing Yili Fine Chemicals), and the mixture is evacuated while stirring for 5 minutes and then is cast to a polytetrafluoroethylene mold preheated to 130° C. The mixture is precured at 130° C. for 1 hour, cooled for mold release and then is postcured at 110° C. for 16 hours, thereby obtaining a cured product, which is then cut to pieces for determination of various properties. The results are listed in table 3. FIG. 2 is the micrograph of the sample.

Preparation of Premix 1:

20 parts by weight of the carboxylated acrylonitrile-butadiene rubber/calcium carbonate composite powder (prepared as follows) are mixed with 100 parts by weight of epoxy resin prepolymer (same as above) and the resultant mixture is milled three times by means of a three-roll mill, thereby obtaining Premix 1. Preparation of the carboxylated acrylonitrile-butadiene rubber/calcium carbonate composite powder:

The irradiated carboxylated acrylonitrile-butadiene rubber latex (prepared by irradiating the carboxylated acrylonitrile-butadiene rubber latex as in Example 8 in an irradiation dose of 1 Mrad in the presence of 5 percent by weight of trimethylolpropane triacrylate, based on the dry weight of the carboxylated acrylonitrile-butadiene rubber latex, with the gel content of rubber particles in the irradiated latex being 90.0%) is compounded with a suspension of nano-calcium carbonate (prepared by dispersing 100 parts by weight of nano-calcium carbonate cake (available from Beijing Nanuotaike Nanotech Company, Brand: 113-SH, solid content: 50 percent by weight, average size in one dimension of its particles: 40 to 60 nm) in 400 parts by weight of water in a high-shear dispersing and emulsifying machine) at a weight ratio of 80:20 (on dry weight), while stirring. The mixed latex is then spray dried to obtain the carboxylated acrylonitrile-butadiene rubber/calcium carbonate composite powder, with the inlet temperature and outlet temperature being 140 to 160° C. and 40 to 60° C., respectively.

Comparative Example 6

72 g of epoxy resin prepolymer (as in Example 17) and 54 g of methyl-tetrahydrophthalic anhydride (as in Example 17) are weighted into a three-necked flask, heated by a thermostatic water bath at 90° C. and then mixed while stirring for 30 minutes. To the resultant mixture is added 0.36 g of triethanolamine (as in Example 17), and the mixture is evacuated while stirring for 5 minutes and then is cast to a polytetrafluoroethylene mold preheated to 130° C. The mixture is precured at 130° C. for 1 hour, cooled for mold release and then is postcured at 110° C. for 16 hours, thereby obtaining a cured product, which is then cut to pieces for determination of various properties. The results are listed in table 3.

Comparative Example 7

The procedure as in Example 17 is followed, except that Premix 1 is replaced by Premix 2 (prepared as follows). Various properties are determined and the results are listed in table 3.

Preparation of Premix 2:

The irradiated carboxylated acrylonitrile-butadiene rubber latex (prepared by irradiating the carboxylated acrylonitrile-butadiene rubber latex as in Example 8 in an irradiation dose of 1 Mrad in the presence of 5 percent by weight of trimethylolpropane triacrylate, based on the dry weight of the carboxylated acrylonitrile-butadiene rubber latex) is spray dried to obtain the powdery carboxylated acrylonitrile-butadiene rubber having a gel content of 90.0% and an average particle size of 90 nm, with the inlet temperature and outlet temperature being 140 to 160° C. and 40 to 60° C., respectively. 20 parts by weight of the powdery carboxylated acrylonitrile-butadiene rubber are mixed with 100 parts by weight of epoxy resin prepolymer (as in Example 17) and the resultant mixture is milled three times by means of a three-roll mill, thereby obtaining Premix 2.

Comparative Example 8

The procedure as in Example 17 is followed, except that the amount of the epoxy resin prepolymer (as in Example 17) is changed into 50.4 g, Premix 1 is replaced by 30.24 g of Premix 3 (prepared as follows). Various properties are determined and the results are listed in table 3.

Preparation of Premix 3:

40 parts by weight of nano-calcium carbonate (Fine Chemical Factory of Beijing University of Chemical Technology, average size in one dimension of its particles: 40 to 60 nm) are mixed with 100 parts by weight of epoxy resin prepolymer (as in Example 17) and the resultant mixture is milled three times by means of a three-roll mill, thereby obtaining Premix 3.

Comparative Example 9

The procedure as in Example 17 is followed, except that 33.12 g of the epoxy resin prepolymer (as in Example 17), 41.5 g of Premix 2 (as in Comparative Example 7) and 6.02 g of Premix 3 (as in Comparative Example 8) are mixed. Various properties are determined and the results are listed in table 3.

TABLE 3

| | Weight ratio of toughener:resin | Impact strength (kJ/m²) | Flexural strength (MPa) | Flexural modulus (GPa) | Heat distortion temerpature(° C.) | Tg(° C.) |
|---|---|---|---|---|---|---|
| Ex. 17 | 12:100 | 28.2 | 97.7 | 2.73 | 104.7 | 111.7(DSC) |
| Comp. Ex. 6 | 0:100 | 11.8 | 104 | 3.13 | 101.3 | 105.8(DSC) |
| Comp. Ex. 7 | 12:100 | 21.4 | 94.5 | 2.56 | 104.9 | 113.1(DSC) |
| Comp. Ex. 8 | 12:100 | 11.6 | 87.1 | 3.32 | 101.8 | 107.7(DSC) |
| Comp. Ex. 9 | 12:100 | 20.1 | 91.9 | 2.71 | 102.9 | 111.2(DSC) |

The invention claimed is:

1. A process for preparing a composite powder comprising rubber particles having a cross-linked structure and a homogeneous structure and inorganic particles distributed between said rubber particles, comprising:
   a. intimately mixing a slurry of inorganic particles with a cross-linked synthetic rubber latex to obtain a mixed latex and then drying the mixed latex; or
   b. vulcanizing a rubber latex by high-energy irradiation in the absence or presence of a cross-linking agent, intimately mixing a slurry of inorganic particles with the irradiated rubber latex to obtain a mixed latex and then drying the mixed latex.

2. The process according to claim 1, wherein the slurry of inorganic particles is an aqueous suspension of inorganic particles.

3. The process according to claim 1, wherein said inorganic particles have an average size of 0.2 to 500 nm in at least one dimension and are selected from the group consisting of elemental metals or alloys thereof; metal oxides; metal or non-metal nitrides; non-metal carbides; non-metal oxides; metal hydroxides; metal salts; mineral earths; and the mixtures of two or more of them; and wherein the weight ratio of the rubber particles contained in said rubber latex to the inorganic particles contained in said slurry is from 99.5:0.5 to 20:80.

4. The process according to claim 3, wherein the weight ratio of the rubber particles contained in said rubber latex to the inorganic particles contained in said slurry is from 99:1 to 50:50.

5. The process according to claim 1, wherein the step of intimately mixing a slurry of inorganic particles to obtain said mixed latex in steps a or b further comprises adding an aqueous solution of water-soluble nucleating agents for plastics in a weight ratio of the rubber particles contained in said latex to the nucleating agent contained in said aqueous solution of 99:1 to 50:50.

6. The process according to claim 5, wherein said nucleating agent is sodium benzoate.

7. The process according to claim 5, wherein the weight ratio of the rubber particles contained in said latex to the nucleating agent contained in said aqueous solution of 97:3 to 70:30.

8. The process according to claim 3, wherein said inorganic particles have an average size of 0.5 to 100 nm in at least one dimension.

9. The process according to claim 3, wherein said inorganic particles are selected from the group consisting of gold, silver, copper, iron, gold alloys, silver alloys, copper alloys, iron alloys, aluminum oxide, magnesium oxide, titanium dioxide, iron sesquioxide, ferroferric oxide, silver oxide, zinc oxide, aluminum nitride, silicon nitride, silicon carbide, silicon dioxide, aluminum hydroxide, magnesium hydroxide, calcium carbonate, barium sulfate, calcium sulfate, silver chloride, asbestos, talc, kaolin, mica, feldspar, wollastonite, montmorillonite, and the mixtures of two or more of them.

10. The process according to claim 1, wherein said cross-linked synthetic rubber latexes used in step a. have a gel content of 80 percent by weight or more.

11. The process according to claim 1, wherein said cross-linked synthetic rubber latexes used in step a. are selected from the group consisting of cross-linked styrene-butadiene latex, cross-linked carboxylated styrene-butadiene latex, cross-linked polybutadiene latex, cross-linked acrylonitrile-butadiene latex, cross-linked carboxylated acrylonitrile-butadiene latex, cross-linked neoprene latex and cross-linked acrylic latex.

12. The process according to claim 1, wherein said rubber latexes used in step b. are selected from the group consisting of natural rubber latex, styrene-butadiene rubber latex, carboxylated styrene-butadiene rubber latex, acrylonitrile-butadiene rubber latex, carboxylated acrylonitrile-butadiene rubber latex, polybutadiene rubber latex, neoprene rubber latex, silicone rubber latex, acrylic rubber latex, butadiene-styrene-vinylpyridine rubber latex, isoprene rubber latex, butyl rubber latex, ethylene-proplyene rubber latex, polysulfide rubber latex, acrylate-butadiene rubber latex, urethane rubber latex, and fluorine rubber latex.

* * * * *